(12) United States Patent
Smithson et al.

(10) Patent No.: US 6,209,916 B1
(45) Date of Patent: Apr. 3, 2001

(54) LOAD LIMITING DEVICE FOR A SEAT BELT

(75) Inventors: Alan Smithson; David Blackadder, both of Carlisle; John Taylor, Penrith; Andrew Downie, Carlisle; Joe Harte, Maryport; Andrew Park, Wigton; Elizabeth Rees, Carlisle, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/579,978

(22) Filed: May 26, 2000

Related U.S. Application Data

(62) Division of application No. 09/164,840, filed on Oct. 1, 1998, now Pat. No. 6,102,439.

(30) Foreign Application Priority Data

Oct. 14, 1997 (GB) .................................... 9721918

(51) Int. Cl.$^7$ ................................................ B60R 22/28
(52) U.S. Cl. ............................................ 280/805; 297/470
(58) Field of Search ................................. 280/805, 806; 297/470

(56) References Cited

U.S. PATENT DOCUMENTS

| | | | |
|---|---|---|---|
| 2,680,476 | * | 6/1954 | Saffell . |
| 3,343,874 | * | 9/1967 | Hildebrandt . |
| 3,889,969 | * | 6/1975 | Otani .................................. 297/470 |
| 5,037,132 | * | 8/1991 | Borlinghaus et al. ............... 297/470 |

FOREIGN PATENT DOCUMENTS

568327 * 11/1993 (EP) .

* cited by examiner

Primary Examiner—Paul N. Dickson
(74) Attorney, Agent, or Firm—Lonnie Drayer

(57) ABSTRACT

A load limiting device is used with a vehicle seat belt during a crash to allow a limited and controlled forward motion of a vehicle occupant after the retractor has locked. The load limiting device decreases the forces exerted by the seat belt on the vehicle occupant's torso. The load limiting device has a container which defines a flow path for a fluid, with a restriction in the flow path. An actuator is located within the container and is movable within the container under the action of a load transmitted to the seat belt webbing from the vehicle occupant under extreme acceleration conditions, to move the fluid through the restriction in the flow path to dissipate a predetermined portion of the load on the webbing.

9 Claims, 11 Drawing Sheets

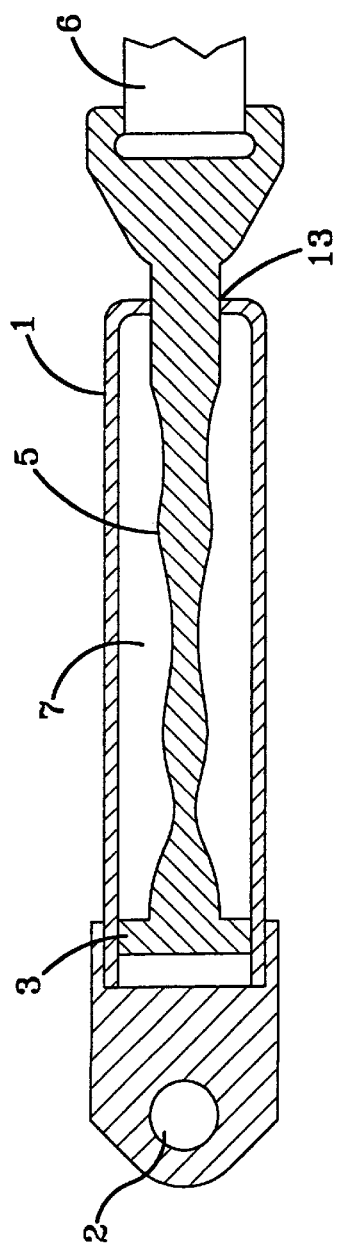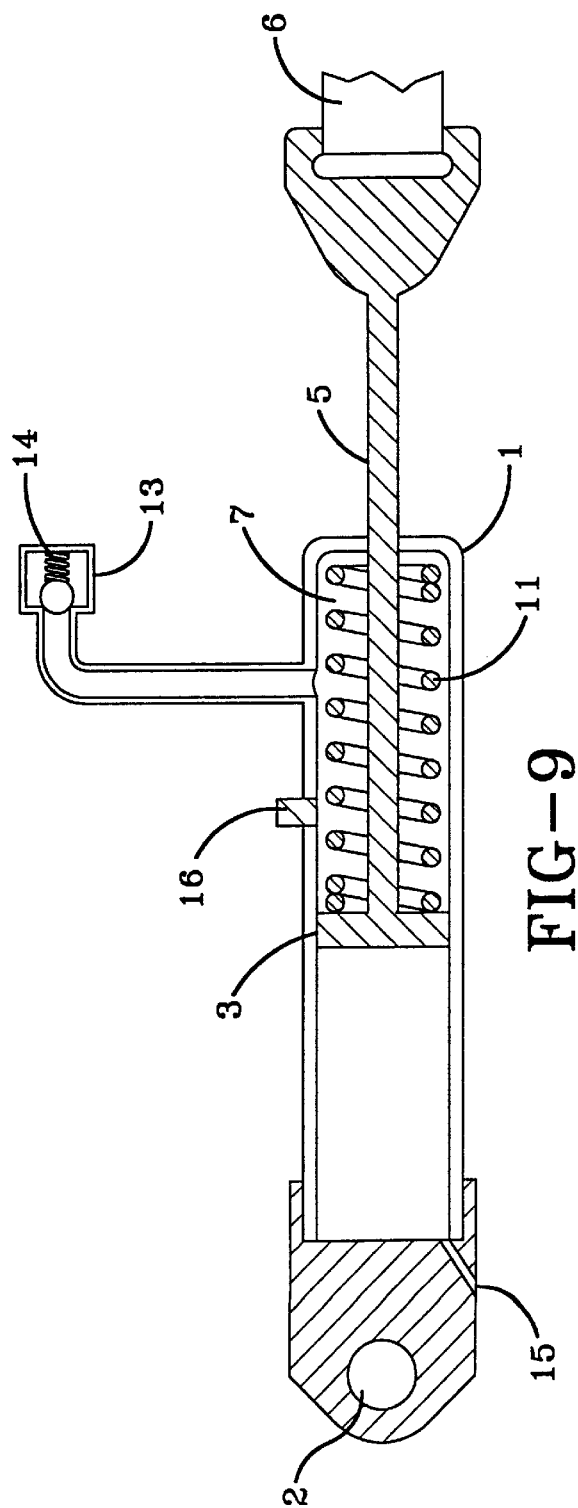
FIG-8
FIG-9

LOAD LIMITING DEVICE FOR A SEAT BELT

This Application is a Division of Ser. No. 09/164,840 filed Oct. 1, 1998, U.S. Pat. No. 6,102,439.

FIELD OF THE INVENTION

The present invention relates to a load limiting device for use with a seat belt.

BACKGROUND OF THE INVENTION

Modern seat belts comprise a length of webbing arranged to pass diagonally across the torso of a vehicle occupant and generally, horizontally across the hip region of the vehicle occupant (the so-called lap portion of the belt). This is known as a three point belt system. One end of the belt webbing is firmly attached to a structural part of the vehicle, such as the floor, and the other end is attached to the spool of a retractor which itself is firmly attached to a structural part of the vehicle, usually the side, B-pillar. The retractor automatically keeps any slack in the belt wound onto the spool and thus keeps tension in the belt. Between the retractor and the other fixed point, a fastening element such as a metal tongue is fixed to the belt with which it can be fastened into a buckle which itself is attached to a fixed part of the vehicle on the other side of the seat.

A clock spring in the retractor allows pay out of webbing under the influence of relatively gentle forwardly directed inertia of the vehicle occupant, for example to allow for normal movement of the vehicle occupant such as reaching forward to activate in-car controls, glove compartments or door pockets.

In the event of a crash the sudden high forward momentum of the vehicle occupant activates a crash sensor which locks the spool against rotation and prevents forward motion of the vehicle occupant to prevent him colliding with the internal structure of the vehicle such as the steering wheel, dashboard or windscreen.

However, it has been found in high velocity crashes that the sudden locking of the seat belt can itself cause injury to the vehicle occupant due to the sudden impact of the torso with the belt webbing.

In recent years it has been proposed to introduce a load limiting effect into the seat belt system so as to allow a limited and controlled forward motion of the vehicle occupant after the retractor has locked. This decreases the forces exerted by the belt on the vehicle occupant's torso.

DISCUSSION OF THE PRIOR ART

Load limiting proposals are described in EP 0297537 wherein a plastically deformable member is used in the retractor, and particularly between the spool and inner most winding of the belt webbing. Alternative load limiting proposals are known in which crushable bushings or nuts or deformable torsion bars are placed in the retractor in the force path between the spool locking mechanism and belt webbing. These proposals are complex and expensive and require the retractor to be specially designed and constructed to incorporate them.

SUMMARY OF THE INVENTION

The present invention proposes improved, simpler and more cost effective load limiting devices for seat belts.

According to one aspect of the present invention there is provided a vehicle safety restraint comprising seat belt webbing, for restraining a vehicle occupant, the webbing being attached to a structural part of the vehicle via a load limiting device, the load limiting device comprising a container defining a flow path for a fluid, an actuator arranged within the container and operable to act on the fluid, and a restriction in the flow path of the fluid, wherein the actuator is movable within the container under the action of load transmitted to the webbing from the vehicle occupant under extreme acceleration or deceleration conditions, to move the fluid through the restriction in the flow path thereby to dissipate a predetermined portion of the load on the webbing.

According to one embodiment of the invention the actuator comprises a piston and the container comprises a cylinder, and either the piston or cylinder is attached to an end of the belt webbing and the other is attached to the structural part of the vehicle.

The restriction may comprise one or more holes in the piston itself so that under pressure fluid is forced from one part of the cylinder, on the high pressure side of the piston, to the other part of the cylinder, on the low pressure side. Alternatively, there is a feedback pipe external to the cylinder to feed fluid under pressure from the high pressure side of the piston to the low pressure side. This feedback pipe may have a further restriction or a valve. The valve may be adjustable to offer a predetermined resistance to fluid flow in dependence upon the force damping characteristics required for the particular seat belt. The valve may be actively controllable, for example in response to a gauge constantly monitoring the pressure of the fluid in the cylinder. In this way the load perceived by the vehicle occupant can be actively tailored, not only to the vehicle concerned, but also to the circumstances which generated the load: the severity of the crash pulse, the weight of the vehicle occupant and the activation of a secondary restraint such as an airbag, or the occurrence of a second crash.

The piston may be arranged so that the cross sectional area which it presents to the fluid is variable. For example, it can be formed of a series of concentric tubes which are picked up by the core piston with increasing belt payout as the load increases. This increases the predetermined load at which the load limiting effect comes into operation and thus increases the restraining effect of the belt with increasing belt extension. This is particularly appropriate for example, in a severe crash and/or with a heavy vehicle occupant. In this case it would be important to ensure that the occupant is stopped completely from his forward motion before the end of the load limiting device is reached.

On the other hand, there are circumstances in which it is desirable to decrease the restraining effect as the crash pulse progresses. This can be done by decreasing the predetermined load at which load limiting becomes operational as the belt payout increases. For example, if an airbag is fitted to the vehicle, then that will take over the restraining effect and stopping the seat belt completely at an early stage of the crash pulse is not important. In this case the piston can be arranged to lose sections of its effective cross section as it travels down the cylinder. The exact arrangement can thus be easily adapted to obtain the required effect.

In an alternative embodiment the actuator is a rotary paddle or vane member or an array of such members, mounted for rotation in a housing containing the fluid. This embodiment may, for example, take the general form of an eccentric vane pump or a peristaltic pump or a swash plate pump, though many other suitable forms of pump arrangement will be evident to those skilled in the art. In each case the fluid flow path within the pump housing is arranged with one or more restrictions to absorb some of the energy of a crash pulse.

BRIEF DESCRIPTION OF THE DRAWINGS

For a better understanding of the present invention and to show how the same may be carried into effect, reference will now be made, by way of example, to the accompanying drawings.

FIG. 8 illustrates, in longitudinal cross-sectional view, another embodiment of the present invention.

FIG. 9 illustrates, again in cross-sectional view a further alternative embodiment.

FIGS. 10a, 10b, 10c and 10d illustrate a further embodiment of the present invention wherein FIG. 10a is a perspective view and FIG. 10d is a graph showing force exerted by the safety restraint using the load limiter of FIG. 10a.

DETAILED DESCRIPTION OF THE INVENTION

Figure 1:
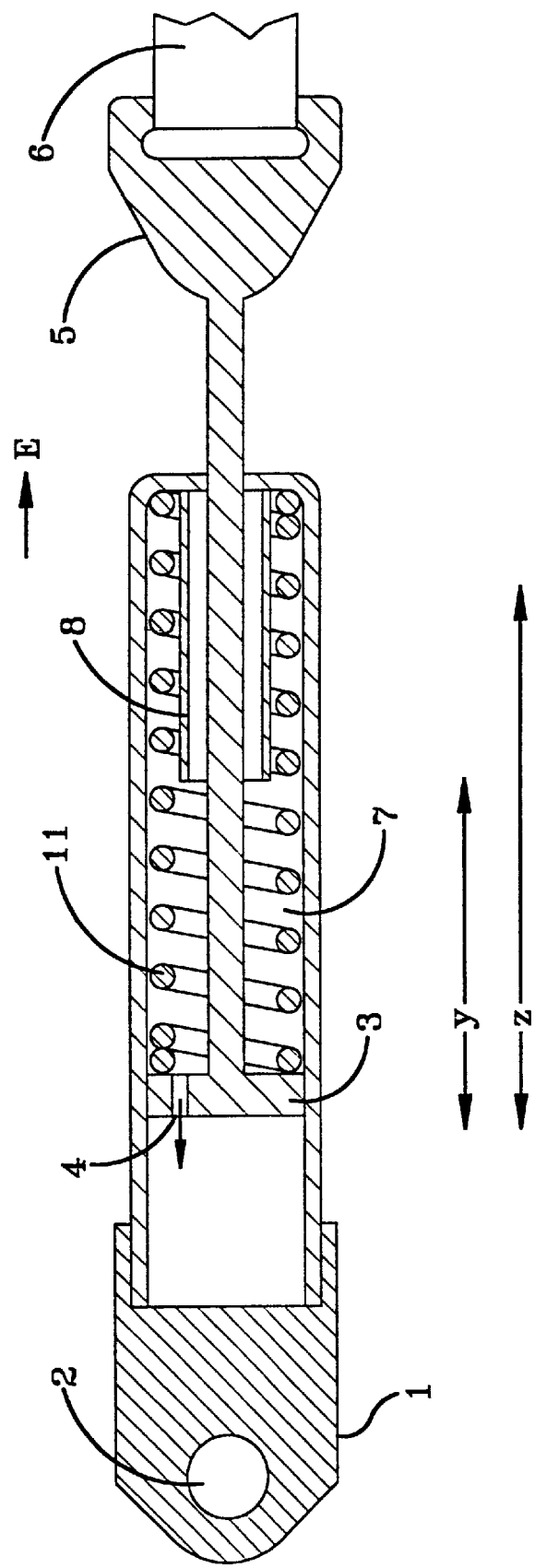
FIG. 1 illustrates one embodiment of the present invention.

FIG. 1 shows a cylinder 1 with a fixing hole 2 at one end for connection to a structural part of a vehicle, (not shown) either at the buckle end or at the sill end of a seat belt. Inside the cylinder 1 is a piston 3 with at least one hole 4 therethrough. The piston 3 is connected by a cable 5 to seat belt webbing 6 and thus the device of FIG. 1 provides a load limiting device between a structural part of the vehicle and the seat belt webbing of a three point system, either at the buckle end or the sill end. Inside the cylinder 1 is a fluid 7 which may be a gas or a liquid or some other extrusible material such as a gel or a foam composition. The exact nature of this extrusible and/or compressible material is chosen to suit the load limiting characteristics required of the load limiting device.

Towards one end of the cylinder a crush tube 8 is arranged coaxially with the cylinder. This crush tube is an optional feature but is incorporated to tune the load limiting effect to increase the energy absorption over a particular range of belt extension, specifically near to the end of travel of the piston. The force is controlled by the size of the hole or holes 4 in the piston 3. A spring 11 is also included to bias the piston in the direction of least extension, i.e. in the rear position. The spring also increases the limiting load.

Figure 2:
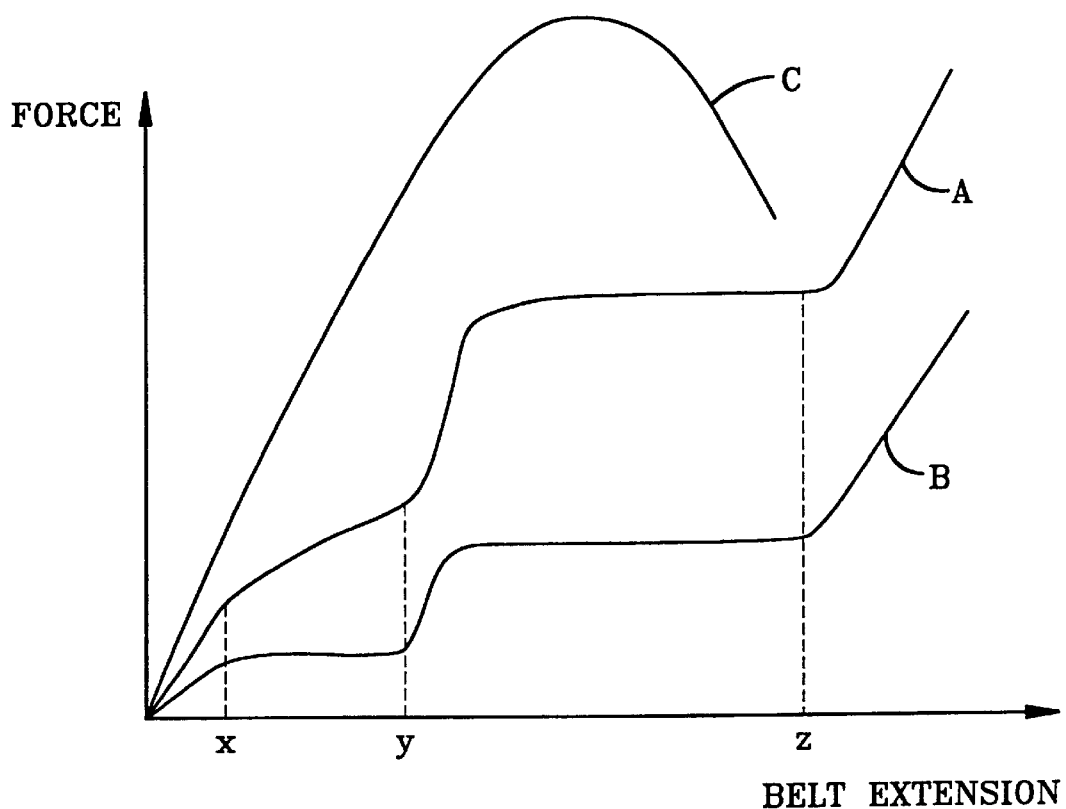
FIG. 2 is a graph illustrating force against belt extension for the embodiment of FIG. 1.

This effect can be seen in FIG. 2 where curve A indicates a high velocity crash force extension curve relationship for the piston-cylinder arrangement of FIG. 1 and line B indicates a low velocity crash force belt extension curve relationship. Line C indicates the crash pulse without any force limiting.

When a crash is indicated, a crash sensor signal causes the retractor to lock up against further webbing extension. The force felt by the vehicle occupant rises relatively steeply in the first part of the curves A and B, mirroring the crash pulse C itself. There will be some forward movement of the vehicle occupant due to belt slack being taken up (film spool effect). This allows a limited belt extension of the distance x after the spool has locked. However when a predetermined level of load is applied to the piston and the film spool effect is over, the inherent inertia of the system is overcome and the piston begins to move along the cylinder 1 applying a force to the fluid or gel 7 in the cylinder 1 and forcing it through the holes 4 in the piston. This absorbs some of the load which would otherwise be felt by the vehicle occupant and allows a further webbing extension y, at a more constant load, as indicated by the relative plateaus in the graphs A and B. In the embodiment of graph A, the fluid compression characteristics exhibit a gradient and thus the plateau between x and y is not so flat as for graph B.

Towards the end of the cylinder the piston encounters the crush tube 8 which slows its movement. The force felt by the vehicle occupant rises again relatively sharply and then exhibits another plateau as indicated between y and z in the graphs A and B when the crush tube 8 is almost completely crushed the force on the vehicle occupant will rise again steeply at the z. However at this point the force of the crash is dissipating as can be seen by the crash pulse indicated by the line C.

Of course the device could be made such that the tube crush force is lower than the fluid compression or extrusion force. In this case the graphs A and/or B will be effectively the same shape but the plateau between x and y will be attributable to the crush tube rather than the fluid and that between y and z to the fluid rather than the crush tube.

Figure 3:
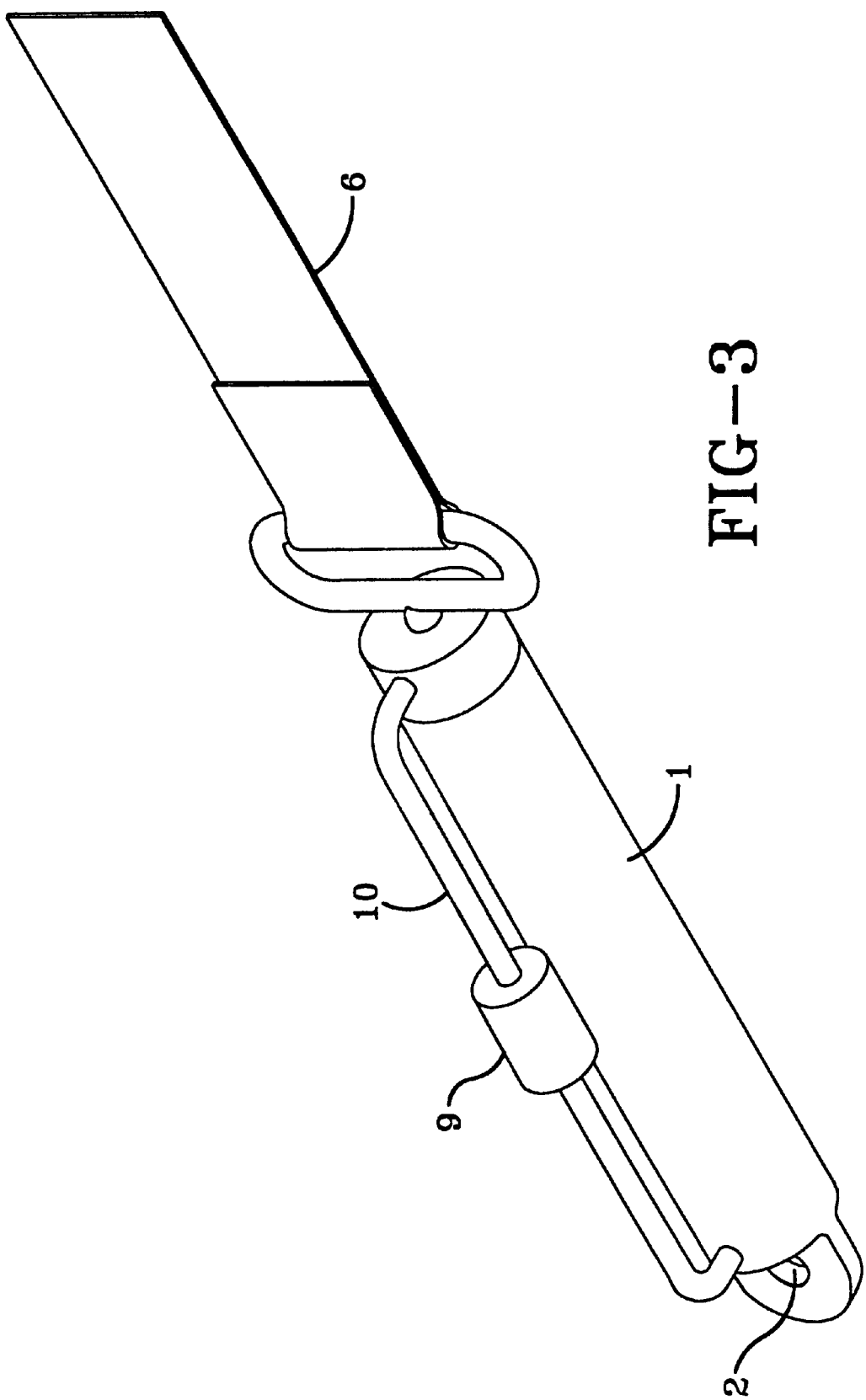
FIG. 3 is a perspective view of a second embodiment of the present invention.

FIG. 3 illustrates another embodiment in which the piston is constructed in solid form, without holes, but a feed back loop pipe 10 carries the fluid from one part to the other part of the cylinder as the piston is pulled along the cylinder under tone from the seat belt. A control valve or restriction 9 is optionally introduced into the feedback pipe 10 so as to effect further control and tuning of the system. The fluid may be gas or liquid and the viscosity of the fluid together with size of the return tube, controls the force required.

Figure 4A:
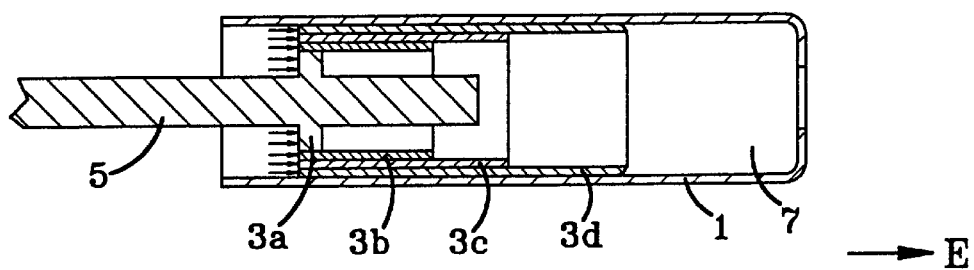
FIGS. 4a, 4b and 4c are cross-sectional views of a part of the embodiment of FIG. 3.
Figure 4B:
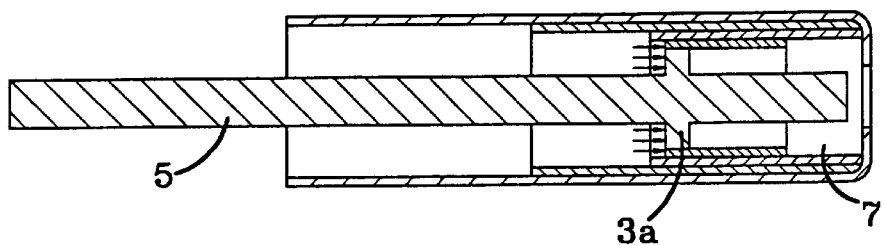
Figure 4C:
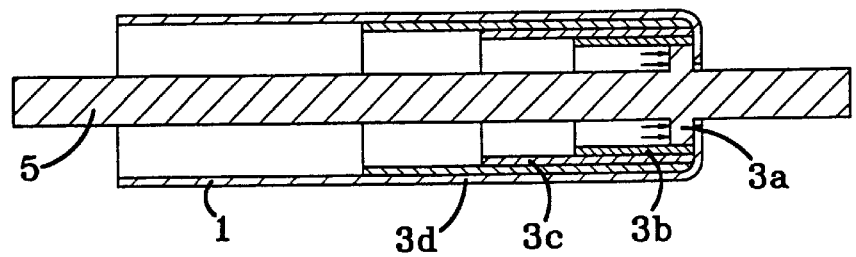

In FIGS. 4a, 4b and 4c a variable size piston surface is used to tune the system further. The arrangement is such that the piston surface area decreases with increasing belt extension so that the limiting load decreases and more payout is allowed for less load, for example as the crash pulse dissipates, or as a secondary restraint such as an airbag comes into operation. This produces a more constant force on the vehicle occupant.

The piston is formed with a small central circular part 3a attached to a cable 5, with a series of concentric cylinders 3b, 3c and 3d fitting snuggly inside each other. At the beginning of the crash pulse the central piston part 3a moves together with all the concentric cylinders, in the direction of arrow E and thus presents a maximum piston surface area to the extrudible/compressible fluid 7. This is shown in FIG. 4a and gives the maximum resistance to movement of the piston and thus the minimum load limiting effect. However, as the belt extension increases, the outer concentric cylinder 3d reaches the end of cylinder 1 and is stopped by it. The adjacent cylinder 3c slides past the outer one as the pull on the belt and thus on cable 5 is still sufficient to overcome the friction between the concentric cylinders. However the effective piston surface area, as shown in FIG. 4b is much reduced and thus the resistance to piston movement through the fluid is decreased, allowing a greater webbing payout for a fixed load, i.e. the load limiting effect is decreased.

As the belt extension increases further each of the outer concentric cylinders 3b to 3d come to a stop at the end of cylinder 1 and only the central piston part 3a continues to move. However at this stage as shown in FIG. 4c an even smaller piston surface is presented and thus the load limiting effect is minimal.

The level of load limiting is a function of the square of the velocity of the crash. This characteristic of fluids is well known in standard damping technology. Thus in a high speed crash the damping effect of the fluid filled load limiter is very much higher than the effect in a low speed crash. Obviously this is advantageous.

Figure 5:
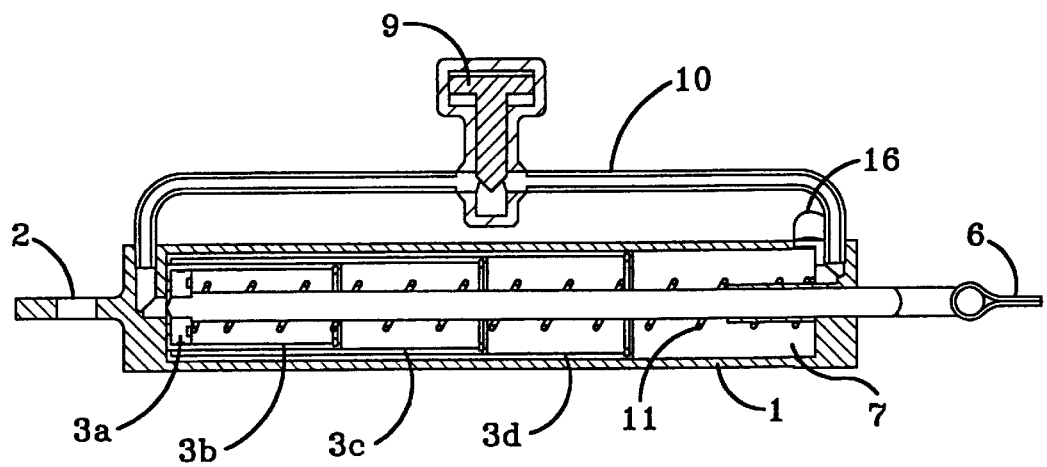
FIG. 5 is a cross-sectional view of a development of the second embodiment.
Figure 6:
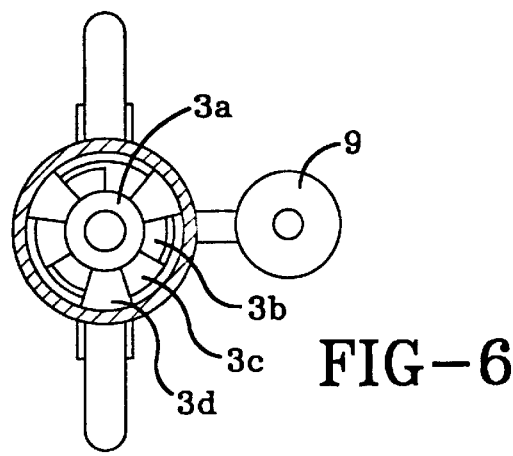
FIG. 6 is a transverse cross-sectional view of the embodiment of FIGS. 3, 4 and 5.

The embodiment of FIGS. 5 and 6 is a variation on the embodiment of FIGS. 3 and 4a. b and c in which the concentric tubes 3a, 3b, 3c and 3d are held together by a spring 11. These concentric cylinder tubes each have three lugs so that they are held in the position shown in FIG. 5 under the action of spring 11 under normal, non-load limiting, conditions. However, when the webbing 6 is put under load and the piston is pulled in the direction E, the inner piston 3a picks up each of the tubes 3b, 3c and 3d in turn so that the rate of extension of the webbing is varied during the full stroke of the piston. In this arrangement the effective surface area of the piston increases with increasing extension of the webbing as the crash pulse develops and thus the piston moves more fluid and requires more force. A load limiter of this type could be used to come into effect earlier in the crash pulse than the load limiter shown in FIGS. 4a to 4c where the surface area of the piston effectively decreases.

A valve 9 is incorporated in the feedback return pipe 10 to restrict the flow of fluid to increases or decrease the force. The valve could be pre set in the factory or controlled according to crash conditions or vehicle occupant size or position. A pressure sensor 16 may be used to collect data to control the valve.

Figure 7:
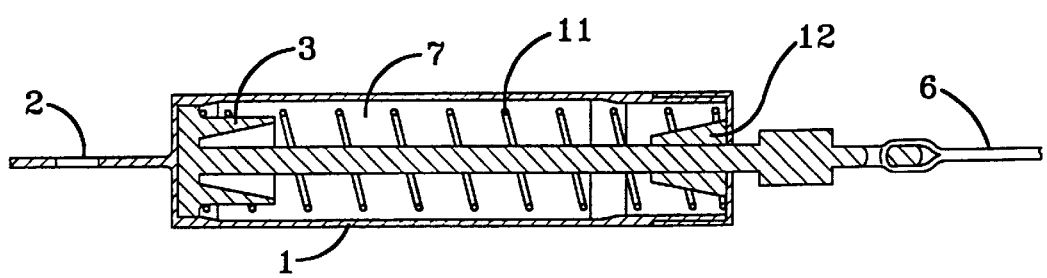
FIG. 7 illustrates a further embodiment of the present invention.

In the embodiment of FIG. 7 the inside of the cylinder 1 is profiled to give a predetermined rate of webbing extension for a given load. In parts, the cylinder bore widens allowing fluid to leak past the piston: the size of the leakage area controls the force. For example the cross-sectional area of the cylinder bore increases with increasing belt extension at the beginning of the stroke but decreases towards the end of the stroke. The particular profile will be chosen to suit the load limiting characteristics, the expected crash pulse and the reaction of the particular safety restraint involved.

The piston 3 also has an internal tapering profile to give additional load limiting near the end of the stroke as the last bit of fluid 7 is trapped and compressed. The internal conical profile of the piston 3 fits over the externally tapering position 12 at the other end of the cylinder 1.

The piston is biased by a spring 11 to its start position as shown in FIG. 7. After the initial extension of the webbing, because of the expanding cross-sectional profile of the cylinder 1, there is an annulus around the periphery of the piston 3 and the fluid 7 is forced through this annulus thus absorbing some of the energy, allowing webbing extension and limiting the load on the vehicle occupant.

FIG. 8 shows an embodiment in which the cable 5 is profiled to provide the appropriate load limiting characteristics. In the rest position no exhaust port exists between the cable and the end of the cylinder 1. As the piston moves in the direction indicated by arrow E the profiled cable 5 (which could also be a solid rod or shaft) first decreases in cross-section and therefore effectively opens up an exhaust port 13. This allows outflow of fluid 7 that absorbs some of the energy of the crash and limits the load felt by the vehicle occupant. The actual shape of the cable or rod 5 is chosen to provide the appropriate load limiting characteristics.

A spring (not show) may be used in the cylinder 1 to bias the piston 3 to the webbing retracted position. A fluid return pipe may be used to channel fluid from one side of the piston to the other to provide load limiting without leakage of fluid out of the cylinder. In this case a variable diameter seal will be provided at the external wall of the cylinder to compensate for the profiling on the cable.

FIG. 9 illustrates another embodiment wherein a ball valve 14 biased by a spring is used to control exhaust vents 13. The piston 3 is biased in its rest position by a spring 11 inside the cylinder 1 and the fluid 7 is on the spring side of the piston. A vent 15 is provided on the other side of the piston 3 to avoid a vacuum being created. A sensor 16 is incorporated to sense the pressure of the fluid 7 and control the ball valve 14 accordingly.

Figure 10A:
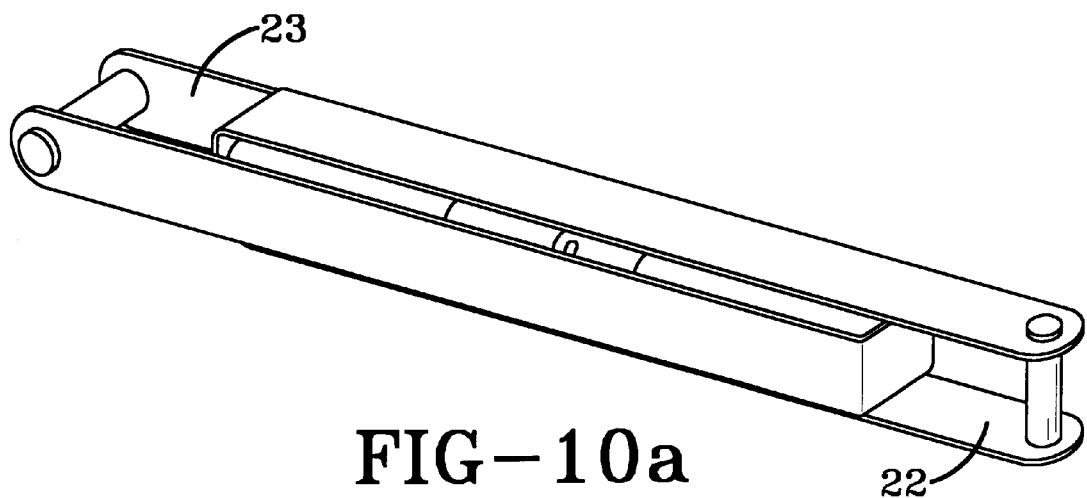
Figure 10B:
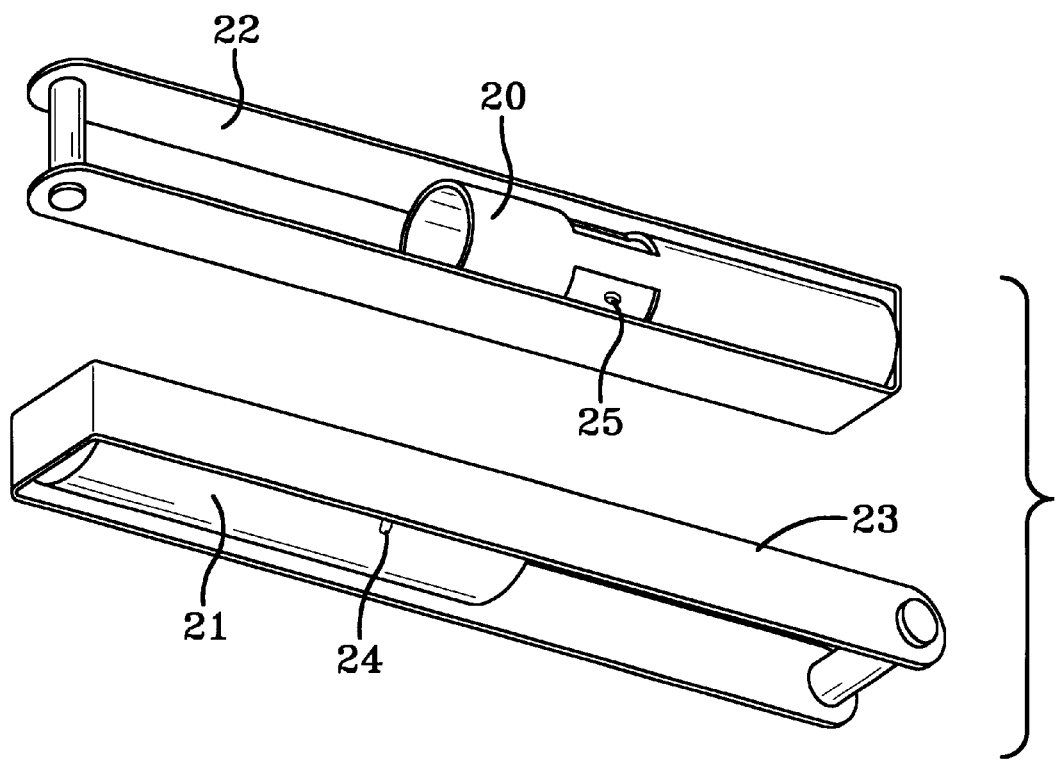
Figure 10C:
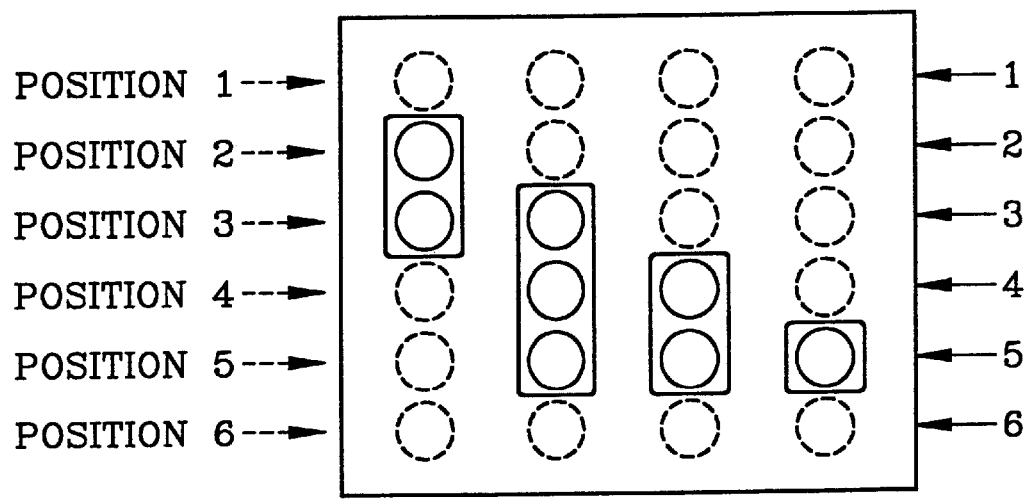

FIGS. 10a to 10c illustrate an embodiment using variable vent areas. Two snugly fitting tubes are used, one sliding inside the other and one having an array of holes, the other having cut-out portions to selectively reveal or cover the holes depending upon the relative positions of the tubes. FIG. 1a shows the assembled position and FIG. 10b the disassembled device. The tubes 20, 21 are mounted in respective frames 22, 23, one of which is fastened to a structural part of the vehicle (not shown), and one of which is fastened to a part of the seat belt webbing (not shown). The cylinder 21 has an array of vent holes 24 whereas cylinder 20 has cutout portions in the form of control windows 25. As the vent holes 24 move inside the outer tube, they allow fluid to escape.

Figure 10D:
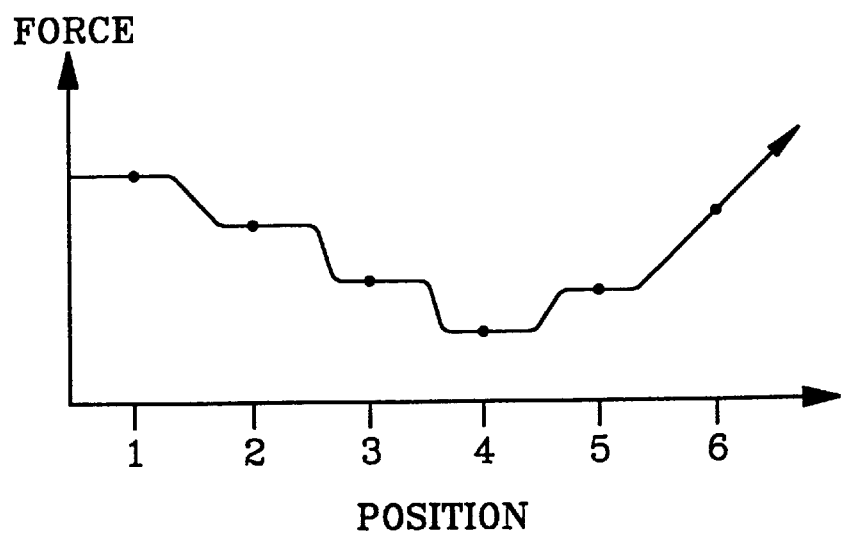

FIG. 10d is a graph of force against belt extension and illustrates exposure of a particular array of vent holes at any particular belt extension. For example, with reference to FIG. 10c, in position 1, all vent holes are covered, in position 2 one vent hole is open, position 3, two vent holes are open etc. In this embodiment, using the particular arrangement of holes and exhaust vents illustrated in FIG. 10c, the force felt by the vehicle occupant decreases with belt extension.

Figure 11A:
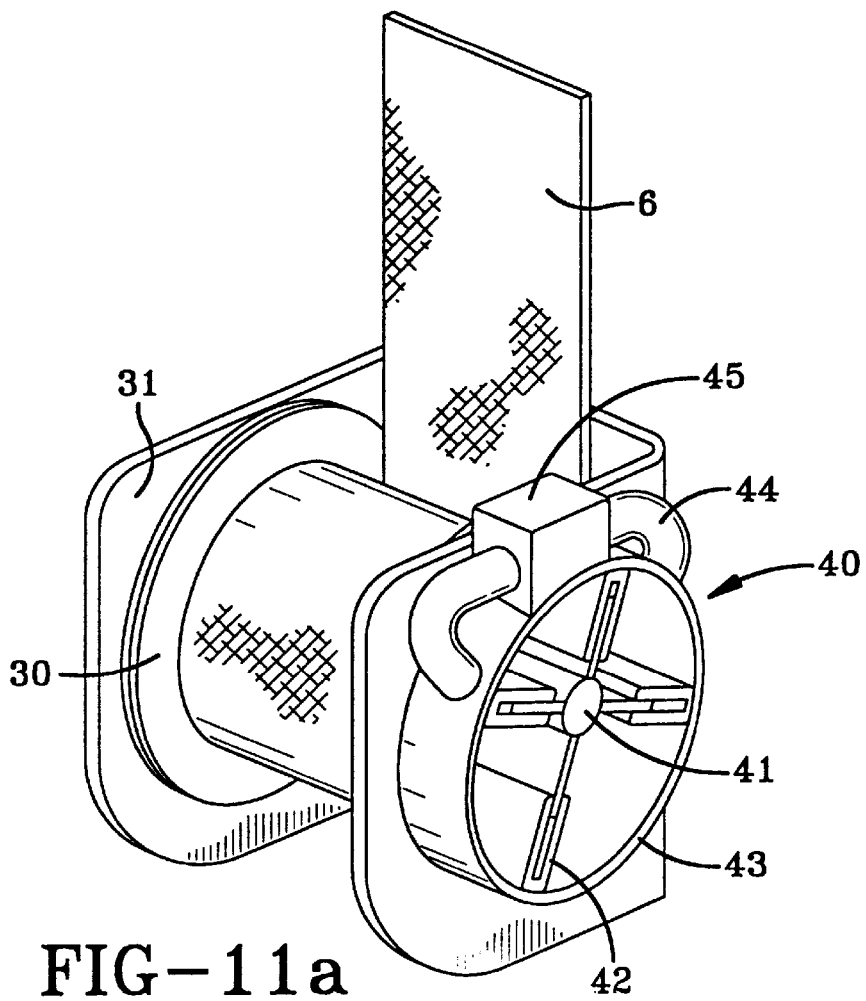
FIGS. 11a and 11b illustrate another embodiment of the present invention, in perspective view in FIG. 11a and in cross-sectional view in FIG. 11b.
Figure 11B:
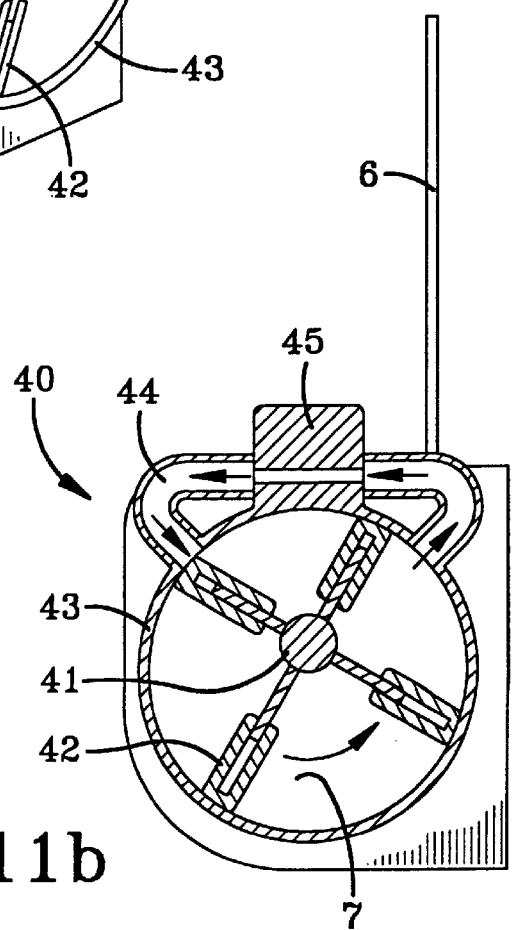
Figure 12A:
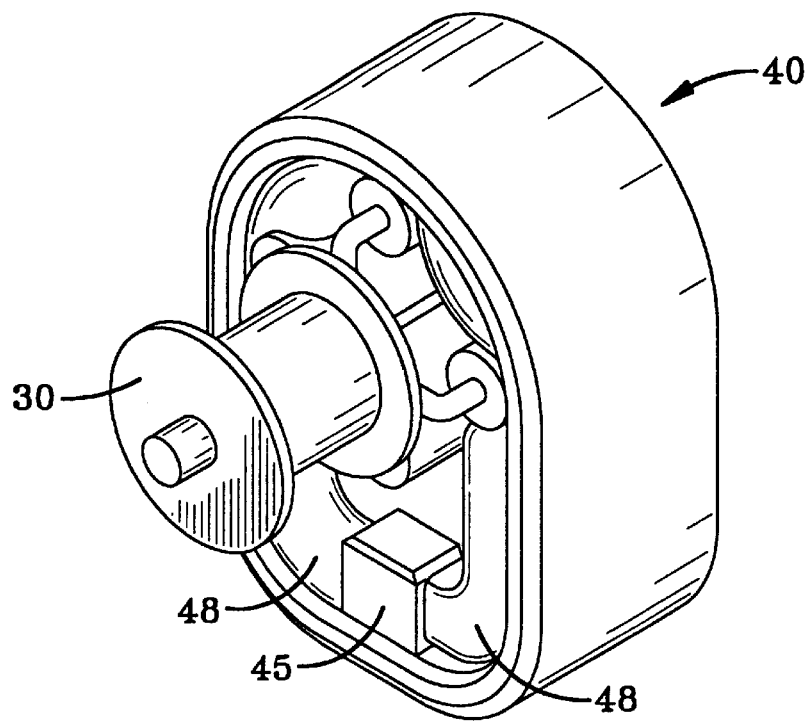
FIGS. 12a and 12b illustrate another embodiment, in perspective view in FIG. 12a and cross-sectional view in FIG. 12b.

FIGS. 11 to 13 illustrate load limiting devices using rotary motion of fluid. Like parts or referenced by like numerals. These load limiting devices work in a similar manner to the linear versions described above. They can be mounted at either the sill end or buckle end of a belt or to any position at which a rotatable member is present or could be introduced. For example a rod or spindle is mounted to a structural part of the vehicle and a few turns of webbing wound around it with the load limiter attached to the rod or spindle. Alternatively the load limiter could be connected to the retractor spool but in this case a clutch arrangement will be used to selectively connect the load limiter only in crash conditions.

In each of the embodiments of FIGS. 11 to 13 seat belt webbing 6 is wound on a rod or spool 30 which is mounted for rotation a frame 31 (which may be a retractor frame). A load limiting device 40 is mounted at the spindle of the spool 30. The load limiting device is a fluid filled pump actuated by rotation of the spool spindle so that the fluid in the pump is driven through restrictions and/or compressed and absorbs some of the energy of the crash.

In the embodiment of FIGS. 11a and 11b the pump is an eccentric vane pump which has a rotor 41 attached to a spool spindle (not shown) and four rotating telescopic blades 42 mounted in a housing 43 defining a chamber filled with fluid 7. The blades 42 keep in constant contact with the inside wall of the housing 43 to maintain a good fluid seal. The housing 43 is eccentrically arranged compared to the spool spindle and the rotor 41. As the blades 42 rotate (counter clockwise in the example shown by the arrow in FIG. 11b) the eccentricity of the housing causes the effective chamber volumes between respective vanes to change in size; decreasing as the vanes 42 approach the upper part of the chamber and increasing as they approach the lower part. Thus the fluid is forced along an additional passage 44 and through a restrictor 45 (which could be programmable) arranged in this additional fluid passage 44.

Figure 12B:
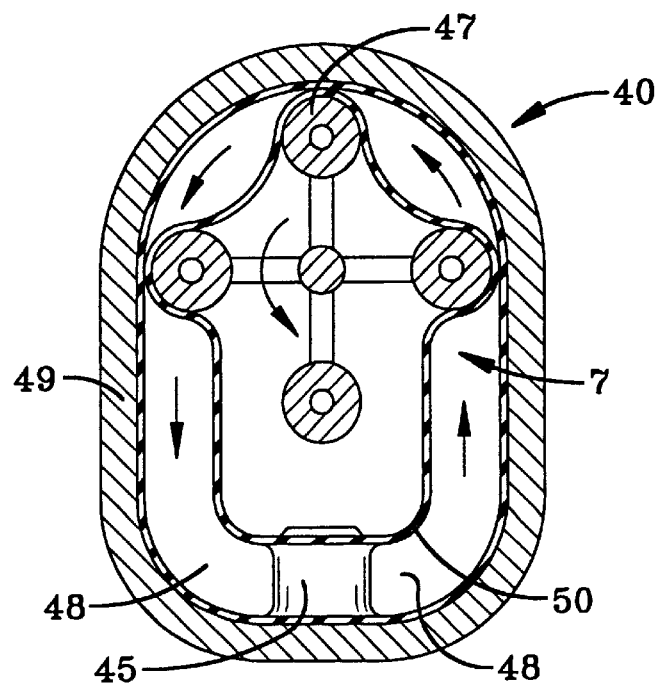

In the embodiment of FIGS. 11a and 12b the pump is a peristaltic pump but the principle is similar. This embodiment comprises four rollers 47 which rotate forcing fluid 7 around the flexible channel 48 supported against the pump outer casing 49, and which has a soft inner wall 50. At the bottom of this channel 48 the fluid is forced through a restriction 45. The size of the restriction controls the force applied to the webbing.

Figure 13A:
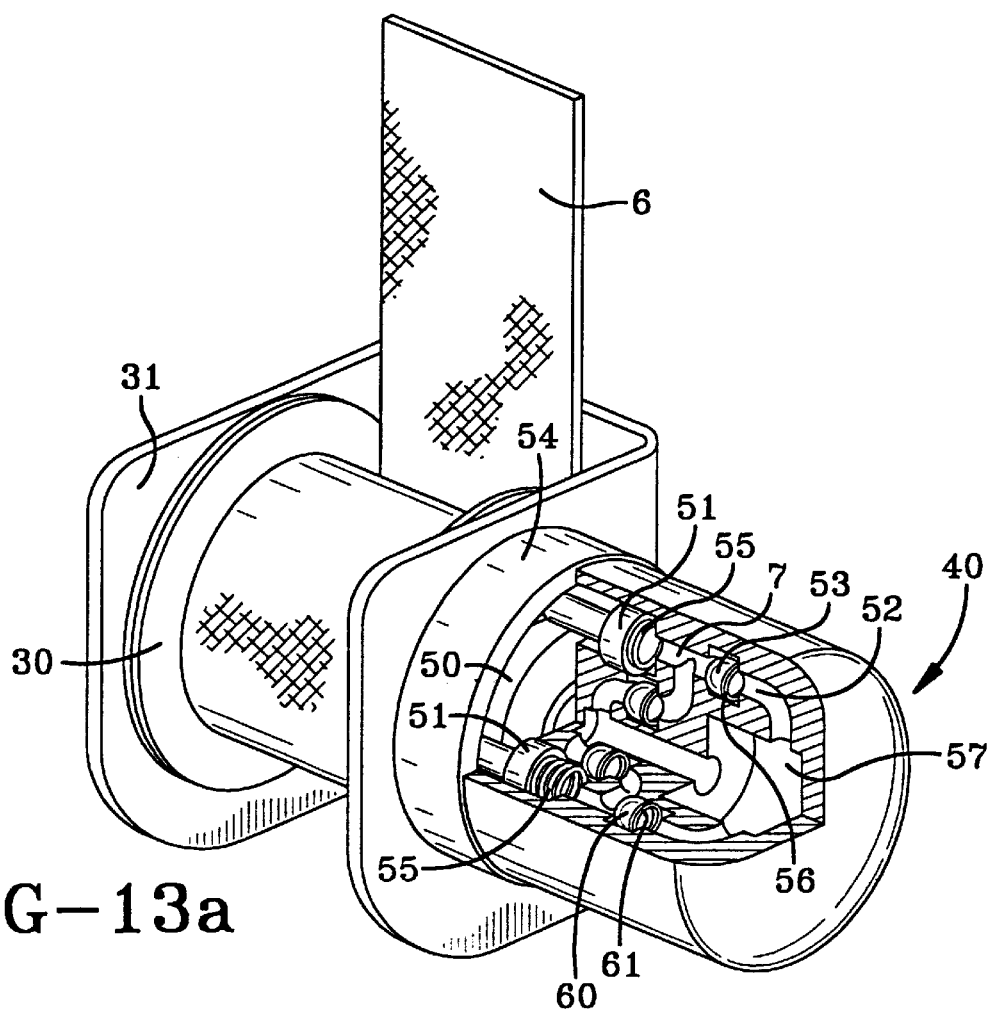
FIG. 13 illustrates another embodiment, in perspective view in FIG. 13a and in fragmentary cross-sectional view in FIG. 13b.
Figure 13B:
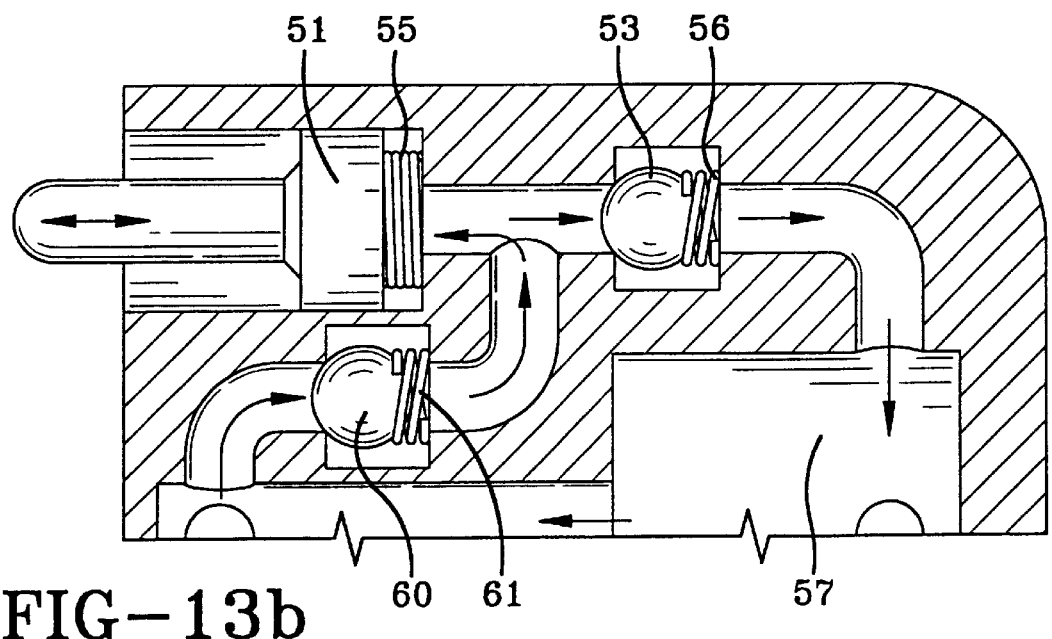

The embodiment shown in FIGS. 13a and 13b comprises a swash plate pump. The spool spindle has a swash plate 54 and an eccentric cam plate 50 which drives pistons 51 to pump fluid 7 through passages 52. Ball valves 53, 60 are disposed in the passages 52 to restrict flow and thus absorb energy. The pistons 51 are biased to their return positions by springs 55 and ball valves 53, 60 have springs 56, 61 to control, the pressure required to force fluid past them. There are four sets of pistons and ball valves; i.e. four sets of pumps and valves in the embodiment shown in FIG. 13a.

FIG. 13b illustrates one pump in more detail. As the swash plate 54 rotates, the eccentric cam plate 50 rotates and piston 51 is pushed in against the action of spring 55. Movement of the piston forces fluid past the ball valve 53, against the action of the spring 56, into fluid storage chamber 57. As the piston returns to its original position it creates a negative fluid pressure opening another ball valve 60 against action of another spring 61 and allows fluid in behind the piston 51. The cycle continues in this way and energy is absorbed by the fluid being forced through the restrictions of the ball valves.

From the foregoing, it will be apparent to those skilled in the art that modifications may be made without departing from the spirit and scope of the invention. Accordingly, the invention is not intended to be limited except as may be made necessary by the appended claims.

We claim:

1. A load limiting device for use with a vehicle safety restraint having seat belt webbing attached to a structural part of a vehicle, the load limiting device comprising a container that is a cylinder defining a flow path for a fluid, an actuator that is a piston arranged within the container and operable to act on the fluid, and a restriction in the flow path of the fluid, either the piston or cylinder is attached to an end of the belt webbing and the other is attached to the structural part of the vehicle, wherein the actuator is movable within the container under the action of a load transmitted to the webbing from a vehicle occupant, to move the fluid through the restriction in the flow path to dissipate a portion of the load on the webbing, and a feedback pipe external to the cylinder to feed fluid under pressure from a high pressure side of the piston to a low pressure side of the piston.

2. The load limiting device of claim 1 wherein the restriction comprises one or more holes in the piston so that under pressure fluid is forced from one part of the cylinder, on a high pressure side of the piston, to another part of the cylinder, on a low pressure side of the piston.

3. The load limiting device of claim 1 wherein the feedback pipe has a further restriction therein.

4. The load limiting device of claim 1 wherein the feedback pipe has a valve associated therewith which is adjustable to offer resistance to fluid flow in dependence upon the force damping characteristics required for the particular seat belt.

5. The load limiting device of claim 1 further comprising a plurality of concentric tubes which are picked up by a core piston with increasing belt payout as the load increases.

6. A load limiting device for use with a vehicle safety restraint having seat belt webbing attached to a structural part of a vehicle, the load limiting device comprising a container defining a flow path for a fluid, an actuator arranged within the container and operable to act on the fluid, the actuator is a rotary paddle mounted for rotation in a housing containing the fluid, and a restriction in the flow path of the fluid, wherein the actuator is movable within the container under the action of a load transmitted to the webbing from a vehicle occupant, to move the fluid through the restriction in the flow path to dissipate a portion of the load on the webbing.

7. A load limiting device for use with a vehicle safety restraint having seat belt webbing attached to a structural part of a vehicle, the load limiting device comprising a container defining a flow path for a fluid, an actuator arranged within the container and operable to act on the fluid, the actuator is an array of rotary paddles mounted for rotation in a housing containing the fluid, and a restriction in the flow path of the fluid, wherein the actuator is movable within the container under the action of a load transmitted to the webbing from a vehicle occupant, to move the fluid through the restriction in the flow path to dissipate a portion of the load on the webbing.

8. A load limiting device for use with a vehicle safety restraint having seat belt webbing attached to a structural part of a vehicle, the load limiting device comprising a container defining a flow path for a fluid, an actuator arranged within the container and operable to act on the fluid, the actuator is a vane member mounted for rotation in a housing containing the fluid, and a restriction in the flow path of the fluid, wherein the actuator is movable within the container under the action of a load transmitted to the webbing from a vehicle occupant, to move the fluid through the restriction in the flow path to dissipate a portion of the load on the webbing.

9. A load limiting device for use with a vehicle safety restraint having seat belt webbing attached to a structural part of a vehicle, the load limiting device comprising a container defining a flow path for a fluid, an actuator arranged within the container and operable to act on the fluid, the actuator is an array of vane members mounted for rotation in a housing containing the fluid, and a restriction in the flow path of the fluid, wherein the actuator is movable within the container under the action of a load transmitted to the webbing from a vehicle occupant, to move the fluid through the restriction in the flow path to dissipate a portion of the load on the webbing.

* * * * *